(12) United States Patent
Park et al.

(10) Patent No.: US 9,870,682 B2
(45) Date of Patent: *Jan. 16, 2018

(54) CONTACT TYPE TACTILE FEEDBACK APPARATUS AND OPERATING METHOD OF CONTACT TYPE TACTILE FEEDBACK APPARATUS

(71) Applicants: Samsung Electronics Co., Ltd., Suwon-si (KR); Industry-University Cooperation Foundation Sogang University, Seoul (KR)

(72) Inventors: Joonah Park, Hwaseong-si (KR); Hyung Kew Lee, Gunpo-si (KR); Eun Hyup Doh, Incheon (KR); Kwang Seok Yun, Seoul (KR)

(73) Assignees: Samsung Electronics Co., Ltd., Suwon-si (KR); Industry-University Cooperation Foundation Sogang University, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/621,695

(22) Filed: Feb. 13, 2015

(65) Prior Publication Data

US 2015/0161859 A1  Jun. 11, 2015

Related U.S. Application Data

(63) Continuation of application No. 13/770,100, filed on Feb. 19, 2013, now Pat. No. 8,976,013.

(30) Foreign Application Priority Data

Apr. 4, 2012  (KR) .................... 10-2012-0034853

(51) Int. Cl.
*H04B 3/36* (2006.01)
*G08B 6/00* (2006.01)
*G06F 3/01* (2006.01)

(52) U.S. Cl.
CPC .............. *G08B 6/00* (2013.01); *G06F 3/016* (2013.01)

(58) Field of Classification Search
CPC ......... G06F 3/016; G08B 6/00; H01R 12/712; H01R 13/20; H01R 24/60;
(Continued)

(56) References Cited

U.S. PATENT DOCUMENTS 3,822,629 A * 7/1974 Smith ...................... G10D 3/00
                                                   84/319
4,810,249 A * 3/1989 Haber ............... A61M 5/31555
                                                   222/390
(Continued)

FOREIGN PATENT DOCUMENTS

JP         5-232859 A     9/1993
JP      2003-316493 A    11/2003
(Continued)

*Primary Examiner* — Daniel Previl
(74) *Attorney, Agent, or Firm* — NSIP Law

(57) ABSTRACT

A contact type tactile feedback apparatus and operational method of the contact type tactile feedback apparatus is provided. The contact type tactile feedback apparatus may enable an object to be in close contact with a power feedback portion to transfer a power sensed by a sensor, using a fixing portion, thereby enabling the object to recognize the power, intuitively.

18 Claims, 11 Drawing Sheets

(58) Field of Classification Search
CPC ...... A45F 2200/055; A45F 5/004; A45F 5/02;
A61B 17/115; A61B 17/1155; A61B
2017/07264; A61K 8/39; A61Q 13/00;
G06K 2009/488
USPC ........ 340/407.1, 825.19, 538.16, 407.2, 965,
340/691.2, 428–429, 545.4, 562
See application file for complete search history.

(56) References Cited

U.S. PATENT DOCUMENTS

| | | | | |
|---|---|---|---|---|
| 6,184,868 | B1* | 2/2001 | Shahoian | A63F 13/06 345/156 |
| 6,445,284 | B1* | 9/2002 | Cruz-Hernandez | G06F 3/016 340/4.12 |
| 8,174,372 | B2* | 5/2012 | da Costa | G06F 3/016 340/407.1 |
| 8,570,163 | B2* | 10/2013 | Makinen | G06F 3/016 340/407.2 |
| 8,976,013 | B2* | 3/2015 | Park et al. | G08B 6/00 340/407.1 |
| 2005/0187438 | A1* | 8/2005 | Xie | A61B 5/14532 600/310 |
| 2009/0303022 | A1* | 12/2009 | Griffin et al. | G06F 3/016 340/407.2 |
| 2010/0046994 | A1 | 2/2010 | Kikuchi et al. | |
| 2010/0270089 | A1* | 10/2010 | Kyung | G06F 3/016 178/18.04 |
| 2010/0321330 | A1 | 12/2010 | Lim et al. | |

FOREIGN PATENT DOCUMENTS

| | | |
|---|---|---|
| JP | 2003-337653 A | 11/2003 |
| JP | 2005-293512 A | 10/2005 |
| JP | 2009-276996 A | 11/2009 |
| JP | 2011-67609 A | 4/2011 |
| KR | 1994-7000703 A | 2/1994 |
| KR | 10-2010-0091382 A | 8/2010 |

* cited by examiner

CONTACT TYPE TACTILE FEEDBACK APPARATUS AND OPERATING METHOD OF CONTACT TYPE TACTILE FEEDBACK APPARATUS

CROSS-REFERENCE TO RELATED APPLICATIONS

This application is a continuation of U.S. patent application Ser. No. 13/770,100, filed on Feb. 19, 2013, which claims the priority benefit of Korean Patent Application No. 10-2012-0034853, filed on Apr. 4, 2012, in the Korean Intellectual Property Office, the disclosure of which is incorporated herein by reference.

BACKGROUND

1. Field

Example embodiments relate to a technology for transferring a sensed power to an object, for example, a finger of a user, by expressing the sensed power as a physical movement.

2. Description of the Related Art

Research on a haptic feedback is actively being performed, as a technology for feeling power, that is, a tactile sense. The haptic feedback refers to artificially generating and transferring a sense that is felt when actually controlling an object with a hand or arm of a human in order to intuitively control, for example, an object in a virtual space or a robot at a far distance. As an example, a haptic feedback apparatus may provide a feedback in a manner of adjusting a level of a load that is felt while controlling a device, when a human controls an object in a virtual space or a robot at a far distance using a specially designed device, for example, a control stick.

Since a relatively great portion of a tactile sense is distributed in a finger, among body parts, a user controls an object with a finger in a sophisticated manner, and easily recognizes strength of a power required to control the object. Accordingly, in order to control an object in a sophisticated manner, using a robot, there is a desire for a technology that transfers, to a finger of a user, power applied to a finger of the robot or power applied to the object by the robot, and enables the user to recognize the power intuitively, thereby controlling power used to control the robot, in a sophisticated manner, based on the recognized power.

SUMMARY

The foregoing and/or other aspects are achieved by providing a contact type tactile feedback apparatus, including a power feedback portion that may be moved in at least one direction based on a sensed signal generated by a sensor, and a fixing portion to adjust a gap between the power feedback portion and the fixing portion such that an object may be in close contact with the power feedback portion.

The power feedback portion may include a first power feedback portion including n first actuators to support, from a lower portion, a first contact portion that may be in contact with an upper surface of the object, and a second power feedback portion to receive the first power feedback portion, the second power feedback portion including m second actuators to move the first power feedback portion, in different directions, from a side of the first power feedback portion. Here, n and m denote natural numbers.

The power feedback portion may further include a lower controller to determine a support height at which the first contact portion may be supported by the n first actuators, based on a first sensed signal generated by the sensor, and to determine a movement distance by which the first power feedback portion may be moved by the m second actuators, based on a second sensed signal generated by the sensor.

The first power feedback portion may be moved in a Z-axial direction, that is, upwards and downwards, based on a support height at which the n first actuators may support the first contact portion, and the second power feedback portion may move the first power feedback portion in an X-axial direction or a Y-axial direction, that is, leftwards and rightwards, based on a movement distance by which the m second actuators may move the first power feedback portion.

The fixing portion may include p pressing actuators to press, in a lower direction, a second contact portion that may be in contact with an upper surface of the object. Here, p denotes a natural number.

The fixing portion may further include an upper controller to determine a press depth to which the second contact portion may be pressed by the p pressing actuators, based on the adjusted gap.

The apparatus may further include a fastener to fasten the power feedback portion and the fixing portion while maintaining the adjusted gap.

The foregoing and/or other aspects are achieved by providing an operating method of a contact type tactile feedback apparatus, the method including, when an object is in contact with a power feedback portion, adjusting a gap between the power feedback portion and a fixing portion such that the object may be in close contact with the power feedback portion, and moving the power feedback portion in at least one direction, based on a sensed signal generated by a sensor.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
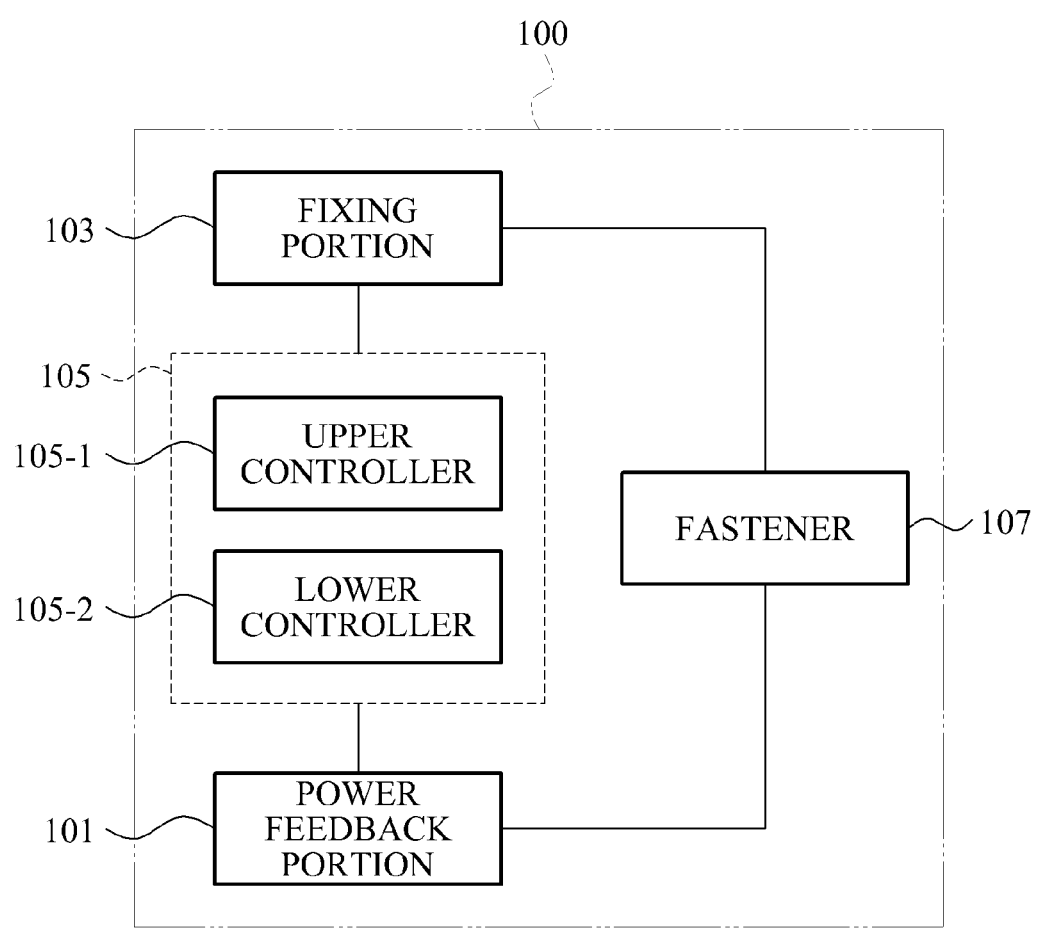
FIG. 1 illustrates a configuration of a contact type tactile feedback apparatus according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a configuration of a contact type tactile feedback apparatus 100 according to example embodiments.

Referring to FIG. 1, the apparatus may include a power feedback portion 101, a fixing portion 103, a controller 105, and a fastener 107.

The power feedback portion 101 may be moved in at least one direction based on a sensed signal generated by a sensor (not shown), to express a power sensed by the sensor as a three-dimensional (3D) physical movement, thereby transferring the power to an object, for example a finger of a user, in contact with the power feedback portion 101. Here, the power feedback portion 101 may include a first power feedback portion (not shown) associated with a power in a vertical direction, and a second power feedback portion (not shown) associated with a power in a horizontal direction.

The first power feedback portion may include n first actuators (not shown) to support, from a lower portion, a first contact portion (not shown) that is in contact with an upper surface of the object. Here, n denotes a natural number. The first power feedback portion may be moved in a vertical direction, for example, a Z-axial direction, based on a support height of the first contact portion that is determined by a lower controller 105-2. Here, the first contact portion may be formed of, for example, an elastic member. The first contact portion may be moved, for example, in terms of a change in height, upon an inflow of air into a pneumatic chamber (not shown) included in a first actuator or an outflow of air from the pneumatic chamber, thereby enabling the support height to be adjusted by the first actuator, and transferring the power to the object in the vertical direction.

That is, the first power feedback portion may enable inflation of the first contact portion by increasing an amount of air to be provided to the first contact portion by the first actuator, and may be moved in an upper direction, that is, a positive (+) Z-axial direction, thereby transferring the power to the object in an upward vertical direction. Conversely, the first power feedback portion may control a level of the inflation of the first contact portion to be relatively low by decreasing the amount of air to be provided to the first contact portion by the first actuator, and may be moved in a lower direction, that is, a negative (−) Z-axial direction, thereby transferring the power to the object in a downward vertical direction.

The second power feedback portion may receive the first power feedback portion, and may include m second actuators (not shown) to move the first power feedback portion, in different directions, from a side of the first power feedback portion. Here, m denotes a natural number. The second power feedback portion may move the first power feedback portion in a horizontal direction, for example, an X-axial direction or a Y-axial direction, based on a movement distance of the first power feedback portion that is determined by the lower controller 105-2, thereby transferring the power to the object in a horizontal direction, through the first contact portion of the first power feedback portion.

For example, although not shown in FIG. 1, the second power feedback portion may include four second actuators, for example, a second actuator_#1, a second actuator_#2, a second actuator_#3, and a second actuator_#4, that are disposed in pairs to face one another. When air is injected into a pneumatic chamber included in the second actuator_#1 of two actuators disposed on an X-axial line, that is, the second actuator_#1 and the second actuator_#3, the second power feedback portion may move the first power feedback portion in an opposite direction of the second actuator_#1, thereby transferring the power to the object in a horizontal direction, that is, a +X-axial direction or a −X-axial direction. When air is injected into a pneumatic chamber included in the second actuator_#2 of the other two actuators disposed on a Y-axial line, that is, the second actuator_#2 and the second actuator_#4, the second power feedback portion may move the first power feedback portion in an opposite direction of the second actuator_#2, thereby transferring the power to the object in a horizontal direction, that is, a +Y-axial direction or a −Y-axial direction.

Here, the first actuator and the second actuator may correspond to, for example, pneumatic balloon actuators, and may adjust the support height of the first contact portion and the movement distance of the first power feedback portion, respectively, using an air pressure determined based on an amount of air.

The fixing portion 103 may adjust a gap between the power feedback portion 101 and the fixing portion 103 such that the object may be in close contact with the power feedback portion 101. In this instance, the fixing portion may adjust the gap between the power feedback portion 101 and the fixing portion 103 in proportion to an input signal, such that the object may be in close contact with the power feedback portion 101. That is, the fixing portion 103 may be disposed to be close to or separated from the power feedback portion 101 in proportion to the input signal that is generated by a generator (not shown), to adjust the gap between the power feedback portion 101 and fixing portion 103, thereby enabling the object to be in close contact with the power feedback portion 101, irrespective of a thickness of the object. Here, the input signal may refer to a signal to determine the gap between the power feedback portion 101 and the fixing portion 103, in proportion to the thickness of the object in contact with the power feedback portion 101.

The fixing portion 103 may include p pressing actuators to press, in a lower direction, a second contact portion that may be in contact with an upper surface of the object. Here, p denotes a natural number.

Here, the second contact portion may be formed of, for example, an elastic member. The second contact portion may be moved in response to an inflow of air into a pneumatic chamber included in a pressing actuator or an outflow of air from the pneumatic chamber, thereby enabling a press depth to be adjusted by the pressing actuator, and enabling the gap between the power feedback portion 101 and the fixing portion 103 to be adjusted.

The pressing actuator may correspond to, for example, a pneumatic balloon actuator, and may adjust the press depth of the second contact portion, using an air pressure determined based on an amount of air.

That is, the fixing portion 103 may move the second contact portion in a vertical direction, that is, the Z-axial direction, through the p pressing actuators, based on the press depth determined by an upper controller 105-1, thereby adjusting the gap between the power feedback portion 101 and the fixing portion 103.

For example, when a relatively great press depth is determined by the upper controller 105-1, the fixing portion 103 may enable the second contact portion to inflate by increasing an amount of air to be provided to the second contact portion by the pressing actuator, and may move the second contact portion in a lower direction, that is, a −Z-axial direction, thereby relatively narrowing the gap between the power feedback portion 101 and the fixing portion 103. Conversely, when a relatively shallow press depth is determined by the upper controller 105-1, the fixing portion 103 may enable a level of the inflation of the second contact portion to be relatively low by decreasing the amount of air to be provided to the second contact portion by the pressing actuator, and may move the second contact portion in an upper direction, that is, a +Z-axial direction, thereby relatively broadening the gap between the power feedback portion 101 and the fixing portion 103.

The controller 105 may include the upper controller 105-1, and the lower controller 105-2. Here, although the upper controller 105-1 and the lower controller 105-2 may be included in an internal portion of the fixing portion 103 and an internal portion of the power feedback portion 101, respectively, positions of the power feedback portion 101 and the fixing portion 103 may not be limited thereto. The power feedback portion 101 and the fixing portion 103 may be disposed in an external portion to perform control.

The upper controller 105-1 may determine the press depth to which the second contact portion may be pressed by the p pressing actuators, based on the gap adjusted by the fixing portion 103. In this instance, the upper controller 105-1 may determine the press depth to which the second contact portion may be pressed by the p pressing actuators, based on the input signal associated with the thickness of the object. Here, the upper controller 105-1 may determine the press depth of the second contact portion, by receiving an input of the input signal before an input of the sensed signal is received by the lower controller 105-2. That is, the upper controller 105-1 may determine the press depth of the second contact portion before the power feedback portion 101 is moved based on the sensed signal, thereby adjusting the gap between the power feedback portion 101 and the fixing portion 103 while the power feedback portion 101 is in a default state, that is, while a power is not sensed by the sensor, and the power feedback portion 101 is separated from the fixing portion 103 by a predetermined gap, without being moved in at least one direction.

The lower controller 105-2 may determine the support height by which the first contact portion may be supported by the n first actuators, based on a first sensed signal generated by the sensor, and may determine the movement distance by which the first power feedback portion may be moved by the m second actuators, based on a second sensed signal generated by the sensor.

The faster 107 may fasten the power feedback portion 101 and the fixing portion 103 while maintaining the adjusted gap between the power feedback portion 101 and the fixing portion 103. That is, the fastener 107 may connect a side of the power feedback portion 101 to a side of the fixing portion 103 so that the adjusted gap may be maintained.

Figure 2A:
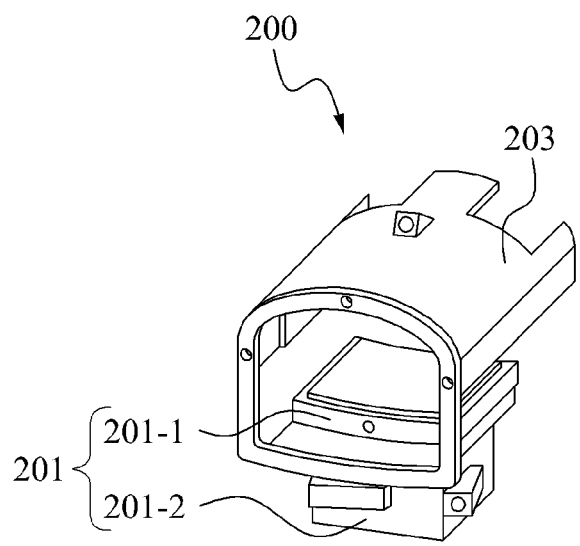
FIGS. 2A and 2B illustrate an example of a contact type tactile feedback apparatus according to example embodiments.
Figure 2B:
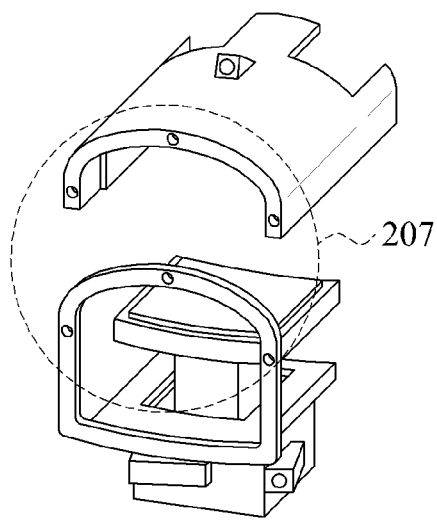

FIGS. 2A and 2B illustrate an example of a contact type tactile feedback apparatus 200 according to example embodiments. Here, FIG. 2A is a perspective view of the contact type tactile feedback apparatus 200, and FIG. 2B is an exploded perspective view of the contact type tactile feedback apparatus 200.

Referring to FIGS. 2A and 2B, the contact type tactile feedback apparatus 200 may include a power feedback portion 201, and a fixing portion 203.

The power feedback portion 201 may be moved in at least one direction based on a sensed signal generated by a sensor (not shown), thereby transferring a power to an object in contact with the power feedback portion 201. Here, the power feedback portion 201 may include a first power feedback portion 201-1 associated with a power in a vertical direction, and a second power feedback portion 201-2 associated with a power in a horizontal direction.

The fixing portion 203 disposed on an upper portion of the power feedback portion 201 may be partially connected to the power feedback portion 201 through the fastener 207, and may adjust a gap between the power feedback portion 201 and the fixing portion 203 such that the object may be in close contact with the power feedback portion 201.

Figure 3A:
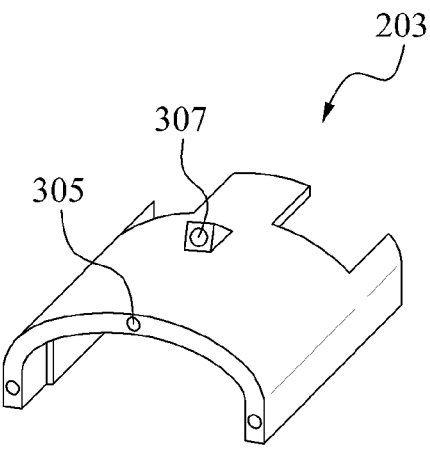
FIGS. 3A through 3C illustrate a fixing portion in the contact type tactile feedback apparatus of FIGS. 2A and 2B.
Figure 3B:
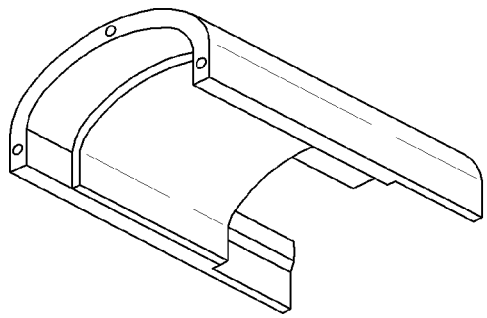
Figure 3C:
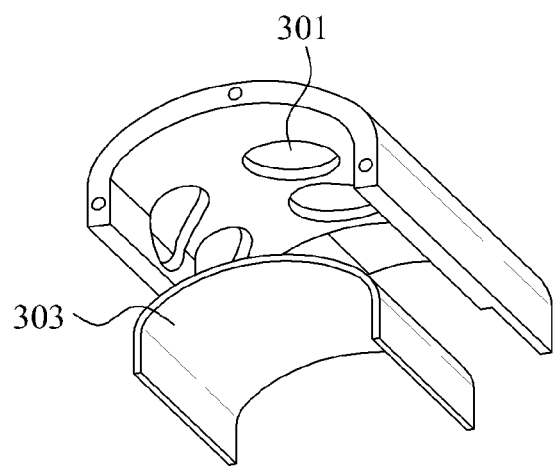

FIGS. 3A through 3C illustrate the fixing portion 203 in the contact type tactile feedback apparatus 200 of FIGS. 2A and 2B.

Referring to FIGS. 3A through 3C, the fixing portion 203 may include a plurality of pneumatic chambers 301 that is disposed on a lower portion of a fixed frame, for example, an arched frame, and a second contact portion 303. Also, the fixing portion 203 may further include a first fastener 305, for example a screw hole, disposed in the fixed frame, to fasten the fixing portion 203 to the power feedback portion 201 of FIGS. 2A and 2B.

The pneumatic chamber 301 may inflate in a lower direction in proportion to an amount of air inserted by a pressing actuator, for example, through an air inlet 307 disposed in an external portion of the fixed frame.

The second contact portion 303 disposed to be attached to a lower layer of the pneumatic chamber 301 may be formed of, for example, an elastic member, and may be moved conjunctively in response to a change in a size of the pneumatic chamber 301. Here, when the second contact portion 303 inflates in the lower direction in response to the change in the size of the pneumatic chamber 301, the second contact portion 303 may press an upper surface of an object in contact with the power feedback portion 201 such that the object may be in close contact with the power feedback portion 201.

Figure 4A:
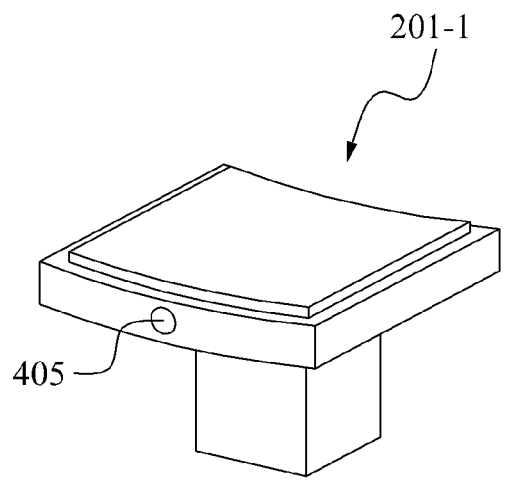
FIGS. 4A through 4C illustrate a first power feedback portion in the contact type tactile feedback apparatus of FIGS. 2A and 2B.
Figure 4B:
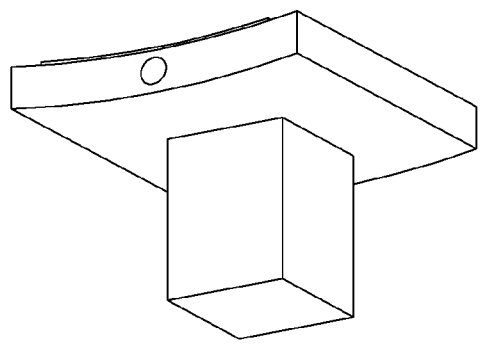
Figure 4C:
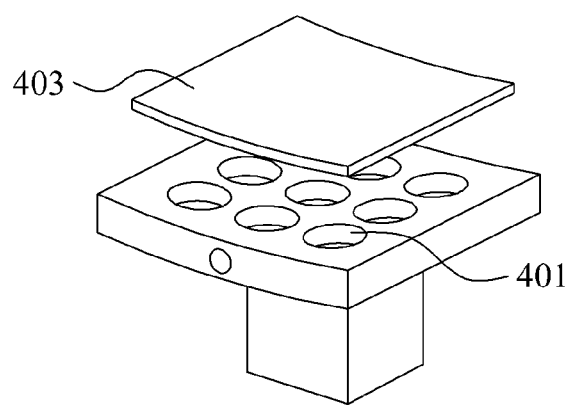

FIGS. 4A through 4C illustrate the first power feedback portion 201-1 in the contact type tactile feedback apparatus 200 of FIGS. 2A and 2B.

Referring to FIGS. 4A through 4C, the first power feedback portion 201-1 may include a plurality of pneumatic chambers 401 that is disposed on an upper portion of a first power feedback frame, for example, a T-shaped frame, and a first contact portion 403.

The pneumatic chamber 401 may inflate in an upper direction in proportion to an amount of air inserted by a first actuator, for example, through an air inlet 405 disposed in a side of the first power feedback frame.

The first contact portion 403 disposed to be attached to an upper layer of the pneumatic chamber 401 may be formed of, for example, an elastic member, and may be moved conjunctively in response to a change in a size of the pneumatic chamber 401. Here, when the first contact portion 403 inflates in the upper direction in response to the change in the size of the pneumatic chamber 401, the first contact portion 403 may transfer a power to the object in an upward vertical direction. Also, when a level of the inflation of the first contact portion 403 is reduced in response to the change in the size of the pneumatic chamber 401, the first contact portion 403 may transfer the power to the object in a downward vertical direction.

Figure 5A:
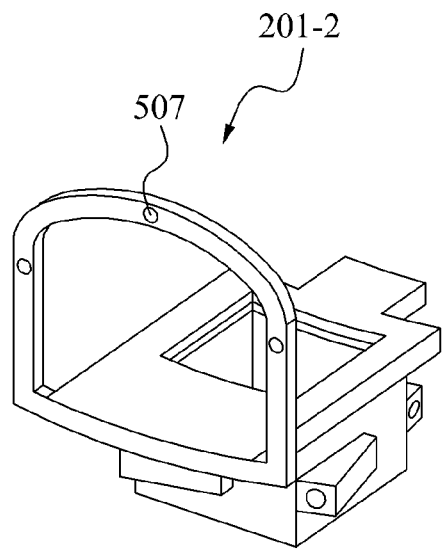
FIGS. 5A through 5C illustrate a second power feedback portion in the contact type tactile feedback apparatus of FIGS. 2A and 2B.
Figure 5B:
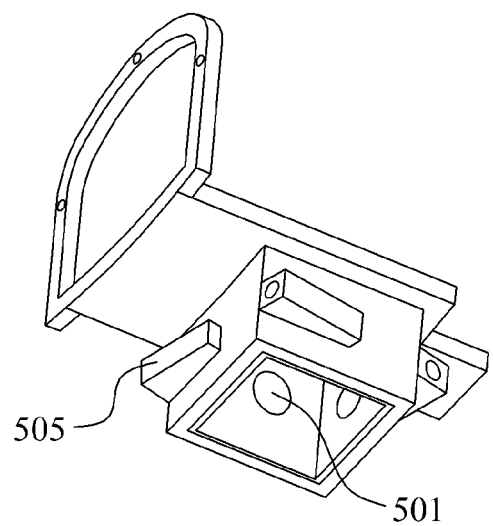
Figure 5C:
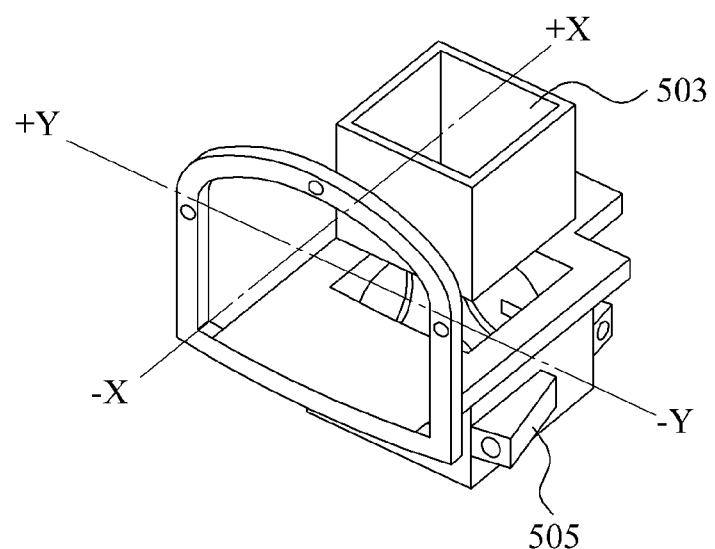

FIGS. 5A through 5C illustrate the second power feedback portion 201-2 in the contact type tactile feedback apparatus 200 of FIGS. 2A and 2B.

Referring to FIGS. 5A through 5C, the second power feedback portion 201-2 may include a plurality of pneumatic chambers 501 that is disposed on an internal side of a second power feedback frame, and a movement feedback portion 503. Also, the second power feedback portion 201-2 may further include a second fastener 507, for example a screw hole, to fasten the second power feedback portion 201-2 to the fixing portion 203 of FIGS. 2A and 2B.

The pneumatic chamber 501 may inflate in a left or right direction in proportion to an amount of air inserted by a first actuator, for example, through a plurality of air inlets 505 disposed in external sides of the second power feedback frame.

The movement feedback portion 503 disposed to be attached to a side of the pneumatic chamber 501 may be formed of, for example, an elastic member, and may be moved conjunctively in response to a change in a size of the pneumatic chamber 501. For example, when the movement feedback portion 503 inflates in a lateral direction in response to the change in the size of the pneumatic chamber 501, the movement feedback portion 503 may move the first power feedback portion 201-1 of FIGS. 2A and 2B, received in the second power feedback portion 201-2, in a left or right direction depending on a position of an inflating pneumatic chamber, thereby transferring the power to the object in contact with the first power feedback portion 201-1 in a horizontal direction.

Figure 6A:
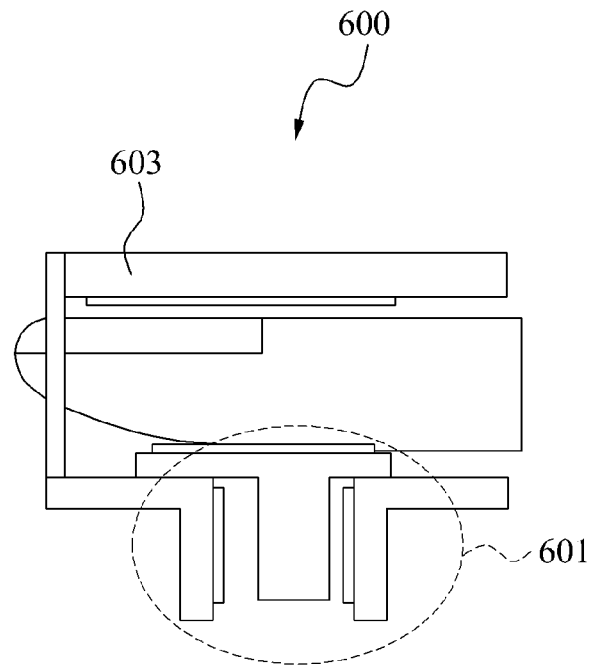
FIGS. 6A and 6B illustrate an operation of fixing an object being inserted in the contact type tactile feedback apparatus of FIGS. 2A and 2B.
Figure 6B:
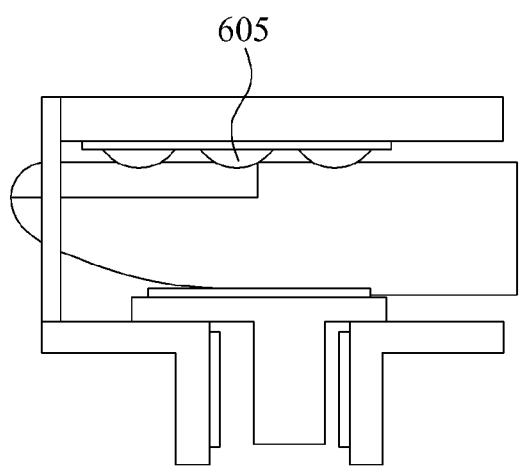

FIGS. 6A and 6B illustrate an operation of fixing an object being inserted in the contact type tactile feedback apparatus 200 of FIGS. 2A and 2B.

Referring to FIGS. 6A and 6B, when the object is inserted while a power feedback portion 601 and a fixing portion 603 are in a default state, that is, while the power feedback portion 601 and the fixing portion 603 are separated from each other by a predetermined gap since an input signal and a sensed signal are not input, a contact type tactile feedback apparatus 600 may adjust the gap between the power feedback portion 601 and the fixing portion 603 such that the object may be in close contact with the power feedback portion 601. Here, the input signal may refer to a signal to determine the gap between the power feedback portion 601 and the fixing portion 603, in proportion to a thickness of the object.

In this instance, the contact type tactile feedback apparatus 600 may adjust the gap between the power feedback portion 601 and the fixing portion 603 in proportion to an input signal such that the object may be in close contact with the power feedback portion 601. For example, the contact type tactile feedback apparatus may enable a second contact portion 605 in the fixing portion 603 to inflate in a lower direction, based on a press depth determined based on the input signal, thereby pressing an upper surface of the object in contact with the power feedback portion 601 such that the object may be in close contact with the power feedback portion 601.

Figure 7A:
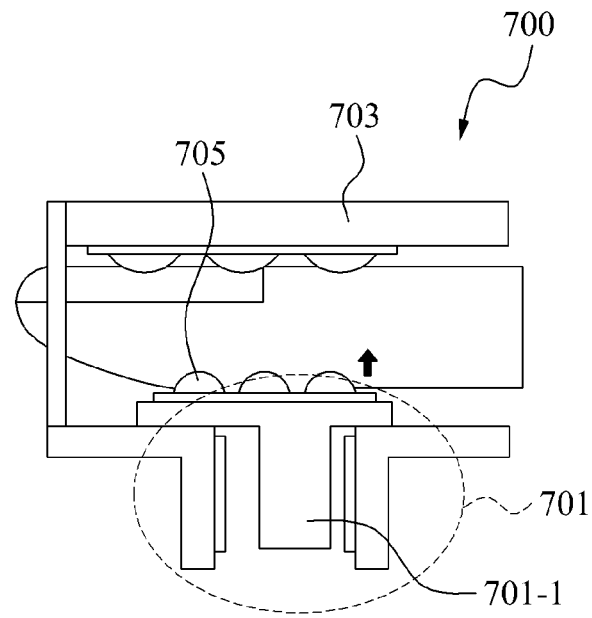
FIGS. 7A and 7B illustrate an operation of transferring a power, in a vertical direction, to an object being inserted in the contact type tactile feedback apparatus of FIGS. 2A and 2B.
Figure 7B:
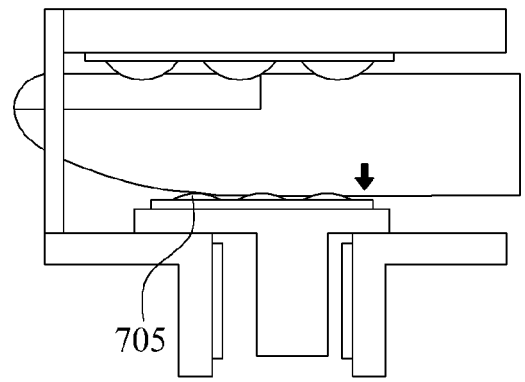

FIGS. 7A and 7B illustrate an operation of transferring a power, in a vertical direction, to an object being inserted in the contact type tactile feedback apparatus 200 of FIGS. 2A and 2B.

Referring to FIGS. 7A and 7B, a contact type tactile feedback apparatus 700 may transfer a power generated by a sensor (not shown) from a power feedback portion 701 to the object, while the object is in close contact with the power feedback portion 701 through a control of a fixing portion 703.

That is, the contact type tactile feedback apparatus 700 may move a first power feedback portion 701-1, thereby transferring the power to the object in a vertical direction.

For example, as shown in FIG. 7A, the contact type tactile feedback apparatus 700 may enable a first contact portion 705 in the first power feedback portion 701-1 to inflate in an upper direction, based on a support height determined based on a first sensed signal generated by the sensor, thereby transferring the power to the object in contact with the first power feedback portion 701-1 in an upward vertical direction. In addition, as shown in FIG. 7B, the contact type tactile feedback apparatus 700 may control a level of the inflation of the first contact portion 705 to be relatively low, based on the support height determined based on the first sensed signal generated by the sensor, thereby transferring the power to the object in contact with the first power feedback portion 701-1 in a downward vertical direction.

Figure 8A:
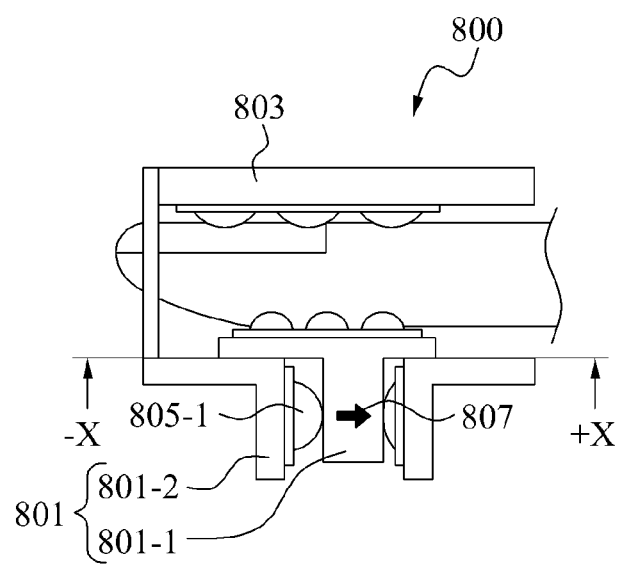
FIGS. 8A through 8D illustrate an operation of transferring a power, in a horizontal direction, to an object being inserted in the contact type tactile feedback apparatus of FIGS. 2A and 2B.
Figure 8B:
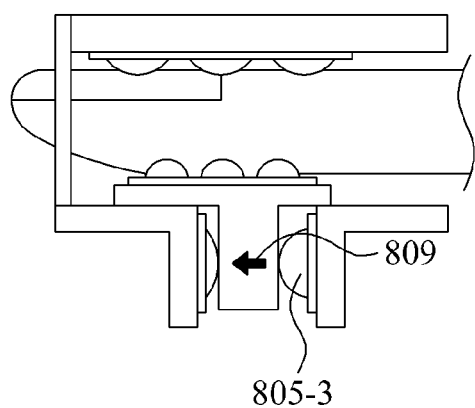
Figure 8C:
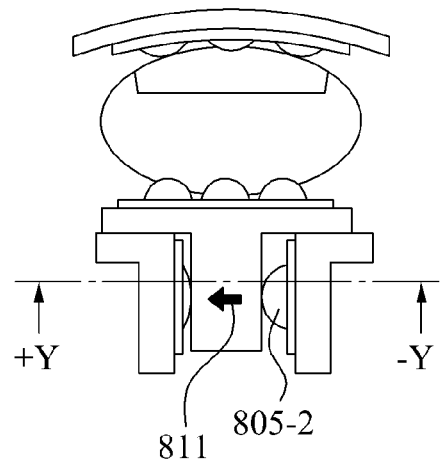
Figure 8D:
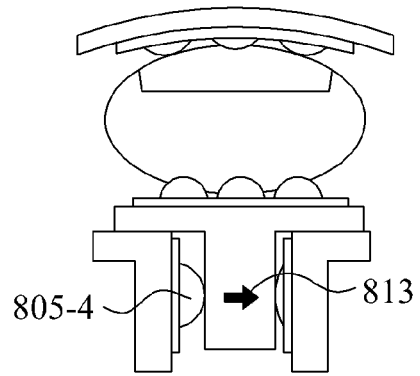

FIGS. 8A through 8D illustrate an operation of transferring a power, in a horizontal direction, to an object being inserted in the contact type tactile feedback apparatus 200 of FIGS. 2A and 2B. Here, FIGS. 8A and 8B are cross-sectional views cut along an X axis of FIG. 5C, and FIGS. 8C and 8D are cross-sectional views cut along a Y axis of FIG. 5C.

Referring to FIGS. 8A through 8D, a contact type tactile feedback apparatus 800 may transfer a power generated by a sensor (not shown) from a power feedback portion 801 to the object, while the object is in close contact with the power feedback portion 801 through a control of a fixing portion 803.

That is, the contact type tactile feedback apparatus 800 may control a second power feedback portion 801-2 to move a first power feedback portion 801-1 received in the second power feedback portion 801-2, thereby transferring the power to the object in contact with the first power feedback portion 801-1 in a horizontal direction. Here, the second power feedback portion 801-2 may include a movement feedback portion that may be disposed on an internal side of a second power feedback frame. The movement feedback portion may include a first movement feedback portion 805-1, a second movement feedback portion 805-2, a third movement feedback portion 805-3, and a fourth movement feedback portion 805-4 that are disposed on sides of the square column, respectively.

For example, as shown in FIG. 8A, the contact type tactile feedback apparatus 800 may enable the first movement feedback portion 805-1 in the second power feedback portion 801-2 to inflate, for example, in a right direction 807, based on a movement distance determined based on a second sensed signal generated by the sensor, to move the first power feedback portion 801-1 received in the second power feedback portion 801-2 in the right direction 807, thereby transferring the power to the object in contact with the first power feedback portion 801-1 in a horizontal direction, for example, a +X-axial direction.

As shown in FIG. 8B, the contact type tactile feedback apparatus 800 may enable the third movement feedback portion 805-3 in the second power feedback portion 801-2 to inflate, for example, in a left direction 809, based on the movement distance determined based on the second sensed signal generated by the sensor, to move the first power feedback portion 801-1 received in the second power feedback portion 801-2 in the left direction 809, thereby transferring the power to the object in contact with the first power feedback portion 801-1 in a horizontal direction, for example, a −X-axial direction.

As shown in FIG. 8C, the contact type tactile feedback apparatus 800 may enable the second movement feedback portion 805-2 in the second power feedback portion 801-2 to inflate, for example, in a left direction 811, based on the movement distance determined based on the second sensed signal generated by the sensor, to move the first power feedback portion 801-1 received in the second power feedback portion 801-2 in the left direction 811, thereby transferring the power to the object in contact with the first power feedback portion 801-1 in a horizontal direction, for example, a +Y-axial direction.

In addition, as shown in FIG. 8D, the contact type tactile feedback apparatus 800 may enable the fourth movement feedback portion 805-4 in the second power feedback portion 801-2 to inflate, for example, in a right direction 813, based on the movement distance determined based on the second sensed signal generated by the sensor, to move the first power feedback portion 801-1 received in the second power feedback portion 801-2 in the right direction 813, thereby transferring the power to the object in contact with the first power feedback portion 801-1 in a horizontal direction, for example, a −Y-axial direction.

Figure 9:
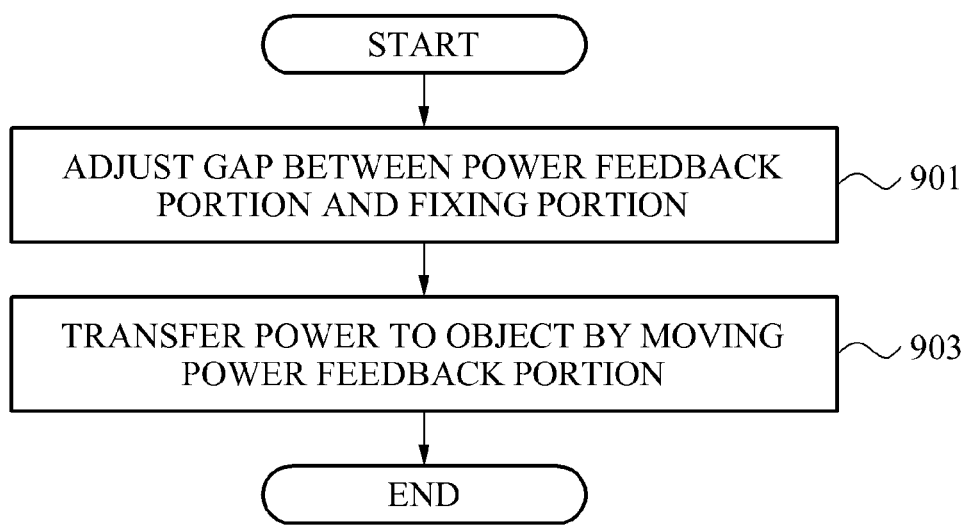
FIG. 9 illustrates an operating method of a contact type tactile feedback apparatus according to example embodiments.

FIG. 9 illustrates an operating method of a contact type tactile feedback apparatus according to example embodiments.

The operating method of the contact type tactile feedback apparatus may be performed when an object, for example, a finger of a user, is in contact with a power feedback portion. In this instance, the object may be inserted between the power feedback portion and a fixing portion connected to the power feedback portion while a predetermined gap between the power feedback portion and the fixing portion is maintained, such that the object may be in contact with the power feedback portion disposed in a lower portion of the fixing portion.

Referring to FIG. 9, in operation 901, the contact type tactile feedback apparatus may adjust the gap between the power feedback portion and the fixing portion such that the object may be in close contact with the power feedback portion. In this instance, the contact type tactile feedback apparatus may adjust the gap between the power feedback portion and the fixing portion, in proportion with an input signal associated with a thickness of the object. In particular, the contact type tactile feedback apparatus may adjust the gap between the power feedback portion and the fixing portion, by pressing, in a lower direction, a second contact portion in the fixing portion in contact with an upper surface of the object, based on a press depth determined based on the input signal.

The contact type tactile feedback apparatus may maintain the adjusted gap between the power feedback portion and the fixing portion such that the object may be in close contact with the power feedback portion. That is, the contact type tactile feedback apparatus may fasten the power feedback portion and the fixing portion, thereby enabling the adjusted gap between the power feedback portion and the fixing portion to be maintained.

In operation 903, the contact type tactile feedback apparatus may move the power feedback portion in at least one direction, based on a sensed signal generated by a sensor, thereby transferring a power sensed by the sensor to the object in contact with the power feedback portion.

In particular, the contact type tactile feedback apparatus may move the power feedback portion in a Z-axial direction, based on a first sensed signal generated by the sensor. In particular, the contact type tactile feedback apparatus may move, in the Z-axial direction, a first power feedback portion in the power feedback portion in contact with the object, using a first actuator disposed in the first power feedback portion in the power feedback portion, based on a support height determined based on the first sensed signal, thereby transferring the power to the object in a vertical direction.

In addition, the contact type tactile feedback apparatus may move the power feedback portion in an X-axial direction or a Y-axial direction, based on a second sensed signal generated by the sensor. In particular, the contact type tactile feedback apparatus may move, in the X-axial direction or the Y-axial direction, the first power feedback portion received in a second power feedback portion, using a second actuator disposed in the second power feedback portion in the power feedback portion, based on a movement distance determined based on the second sensed signal, thereby transferring the power to the object in contact with the first power feedback portion in a horizontal direction.

That is, the contact type tactile feedback apparatus may express the power sensed by the sensor as a 3D physical movement while the object is in close contact with the power feedback portion, thereby enabling the object in contact with the power feedback portion to recognize the power intuitively.

The methods according to the above-described embodiments may be recorded in non-transitory computer-readable media including program instructions to implement various operations embodied by a computer. The media may also include, alone or in combination with the program instructions, data files, data structures, and the like. Examples of program instructions include both machine code, such as produced by a compiler, and files containing higher level code that may be executed by the computer using an interpreter.

According to example embodiments, a contact type tactile feedback apparatus may express a power sensed by a sensor as a 3D physical movement, using a power feedback portion that may be moved in at least one direction based on a sensed signal, thereby readily transferring the power to an object, for example a finger of a user, in contact with the power feedback portion.

According to example embodiments, a contact type tactile feedback apparatus may enable an object to be in close contact with a power feedback portion using a fixing portion to adjust a gap between the power feedback portion and the fixing portion, thereby enabling the object to recognize a power sensed by a sensor more intuitively.

According to example embodiments, a contact type tactile feedback apparatus may be applied to a robot, for example a surgical robot, for controlling an object or a sensitive tissue, for example, a human body, to transfer, to a user, a power sensed when a robot terminal is in contact with the tissue, thereby enabling collaborative control of a power based on the transferred power, and improving efficiency and safety of a task performed using a robot.

Although embodiments have been shown and described, it would be appreciated by those skilled in the art that changes may be made in these embodiments without departing from the principles and spirit of the disclosure, the scope of which is defined by the claims and their equivalents.

The invention claimed is:

1. An apparatus comprising:
   a tactile feedback portion configured to move a finger in at least one direction based on a signal; and
   a fixing portion configured to adjust a gap between the tactile feedback portion and the fixing portion through a movement of the fixing portion to place the finger in closer contact with the tactile feedback portion, wherein the tactile feedback portion and the fixing portion are configured to enclose a portion of the finger placed within the gap, and wherein the signal is associated with tactile feedback from a remote sensor in a remote device or a virtual object in a virtual space.

2. The apparatus of claim 1, wherein the tactile feedback is generated based on power applied to the remote device, and wherein the remote device is controlled based on a movement of the finger.

3. The apparatus of claim 1, wherein the tactile feedback is generated based on power applied to the virtual object, and wherein the virtual object is controlled based on a movement of the finger.

4. The apparatus of claim 1, wherein the tactile feedback portion is configured to provide tactile feedback to the finger.

5. The apparatus of claim 4, wherein the fixing portion is configured to adjust the gap to fix the finger between the tactile feedback portion and the fixing portion.

6. The apparatus of claim 1, wherein the tactile feedback portion comprises:

a first tactile feedback portion comprising n first actuators to support a lower portion of a first contact portion that is in contact with an upper surface of the finger; and a second tactile feedback portion configured to receive the first tactile feedback portion, the second tactile feedback portion comprising m second actuators configured to move the first tactile feedback portion, from a side of the first tactile feedback portion, in a second direction that is different than the first direction, wherein n and m denote natural numbers.

7. The apparatus of claim 1, wherein the fixing portion comprises:

actuators configured to press, in a second direction that is different than the first direction, a second contact portion that is in contact with an upper surface of the finger.

8. The apparatus of claim 1, wherein the fixing portion is controlled to adjust the gap based on a fixing signal that is dependent on a thickness of the finger.

9. The apparatus of claim 1, wherein the apparatus is configured to apply a force, proportional to a force sensed by the remote sensor, to the finger through the tactile feedback portion while the finger is made to be in close contact with the tactile feedback portion through control of the fixing portion.

10. A method of providing a tactile feedback, comprising:
moving a tactile feedback portion in at least one direction towards a finger based on a signal; and
adjusting a gap between the tactile feedback portion and a fixing portion through a movement of the fixing portion to place the finger in closer contact with the tactile feedback portion, wherein the tactile feedback portion and the fixing portion are configured to enclose a portion of the finger placed within the gap, and wherein the signal is associated with tactile feedback from a remote sensor in a remote device or a virtual object in a virtual space.

11. The method of claim 10, wherein the tactile feedback is generated based on power applied to the remote device, and wherein the remote device is controlled based on a movement of the finger.

12. The method of claim 10, wherein the tactile feedback is generated based on power applied to the virtual object, and wherein the virtual object is controlled based on a movement of the finger.

13. The method of claim 10, wherein the tactile feedback portion is configured to provide tactile feedback to the finger.

14. The method of claim 13, wherein the moving of the tactile feedback portion comprises moving the tactile feedback portion relative to the finger located between the tactile feedback portion and the fixing portion.

15. The method of claim 10, wherein the moving comprises:

moving the tactile feedback portion in a Z-axial direction based on a first signal associated with a tactile feedback, and moving the tactile feedback portion in an X-axial direction or a Y-axial direction, based on a second signal associated with a tactile feedback.

16. The method of claim 10, wherein the fixing portion is controlled to adjust the gap based on a fixing signal that is dependent on a thickness of the finger.

17. The method of claim 10, further comprising transferring a force, proportional to a force sensed by the remote sensor, to the finger through the tactile feedback portion while the finger is made to be in close contact with the tactile feedback portion through control of the fixing portion.

18. A non-transitory computer-readable medium that, when executed by at least one processor, cause the at least one processor to implement a method of providing a tactile feedback, the method comprising:

moving a tactile feedback portion towards a finger based on a signal associated with a tactile feedback; and adjusting a gap between the tactile feedback portion and a fixing portion through a movement of the fixing portion to place the finger in closer contact with the tactile feedback portion, wherein the tactile feedback portion and the fixing portion are configured to enclose a portion of the finger placed within the gap, and wherein the signal is associated with tactile feedback from a remote sensor in a remote device or a virtual object in a virtual space.

* * * * *